United States Patent
Chen et al.

(10) Patent No.: US 9,217,404 B2
(45) Date of Patent: Dec. 22, 2015

(54) ATOMIZER USED IN THE INNER COMBUSTION ENGINE AND HAVING ENERGY SAVING AND DEBRIS REDUCING FUNCTION

(71) Applicants: Wen-Pin Chen, New Taipei (JP); Chiu-Yueh Tung, New Taipei (TW)

(72) Inventors: Wen-Pin Chen, New Taipei (JP); Chiu-Yueh Tung, New Taipei (TW)

( * ) Notice: Subject to any disclaimer, the term of this patent is extended or adjusted under 35 U.S.C. 154(b) by 212 days.

(21) Appl. No.: 14/079,642

(22) Filed: Nov. 14, 2013

(65) Prior Publication Data
US 2015/0129678 A1 May 14, 2015

(51) Int. Cl.
*A01G 27/00* (2006.01)
*F02M 51/00* (2006.01)
*F02M 61/18* (2006.01)
*F02M 61/16* (2006.01)

(52) U.S. Cl.
CPC ........... *F02M 51/005* (2013.01); *F02M 61/165* (2013.01); *F02M 61/18* (2013.01)

(58) Field of Classification Search
CPC ... F02M 51/005; F02M 61/18; F02M 61/165; B05B 12/004; B05B 13/0257
USPC .......................... 239/67–69, 71, 74, 302, 321
See application file for complete search history.

(56) References Cited

U.S. PATENT DOCUMENTS

| | | | | |
|---|---|---|---|---|
| 1,505,607 | A * | 8/1924 | Schroeder | 239/223 |
| 2005/0059272 | A1* | 3/2005 | Zhang | 439/74 |
| 2008/0223953 | A1* | 9/2008 | Tomono et al. | 239/102.2 |
| 2008/0283626 | A1* | 11/2008 | Aldana et al. | 239/68 |
| 2011/0109001 | A1* | 5/2011 | Bortolussi | 261/64.5 |

* cited by examiner

*Primary Examiner* — Davis Hwu

(57) ABSTRACT

An atomizer used in the inner combustion engine and having energy saving and debris reducing function, which includes: a housing having an inlet pipe and an outlet pipe, the interior of the housing is installed with a flow regulating mask, and a bottom plate is installed inside the housing; a working fluid filled in the housing and disposed above the bottom plate; a floating carrier installed in the housing and floating on the liquid surface of the working fluid; at least an atomizing mechanism installed on the floating carrier; and a sensing controlling mechanism installed below the bottom plate and connected to the atomizing mechanism. Accordingly, with the driving and regulating provided by the sensing controlling mechanism, the flow regulating mask allows the atomizing mechanism to atomize proper amount of water with respect to the actual conditions of the rotation speed and loading status of an engine.

9 Claims, 9 Drawing Sheets

Fig. Performance Characteristic Of Nebulizer

ATOMIZER USED IN THE INNER COMBUSTION ENGINE AND HAVING ENERGY SAVING AND DEBRIS REDUCING FUNCTION

BACKGROUND OF THE INVENTION

1. Field of the Invention

The present invention relates to an atomizer used in the inner combustion engine and having energy saving and debris reducing function, especially to an atomizer used in the inner combustion engine and having energy saving and debris reducing function in which with the driving and regulating provided by a sensing controlling mechanism, a flow regulating mask allows an atomizing mechanism to atomize the proper amount of water with respect to the actual conditions of the rotation speed and loading status of an engine thereby allowing the atomized mist to be guided into the inner combustion engine through the flow regulating mask, so the inner combustion engine is provided with effects of reducing the exhaust, reducing the oil consumption, increasing the service life, increasing the horse power and the torque output, and also be provided with advantages of simple structure, low cost, excellent atomization effect, small volume, light weight, low power consumption, maintenance free, low cost of consumable parts and allowing the user to install by himself.

2. Description of Related Art

In the technical features disclosed in many patents, the applicant of the present invention has categorized the technical features into followings:

First: take the U.S. Pat. Nos. 4,096,829, 4,311,118, 4,191,134, 4,364,370, 4,424,676, 4,440,166, 4,448,153, 4,461,254, 4,502,420, 4,558,665, 4,960,080, 5,522,349 and 6,637,382, the Japan Patent No. 58057205 and the South Korea Patent No. 2003050456 for example. The technical features of the mentioned patents is that a mechanical high pressure nozzle is used for atomizing, and water is ejected into a combustion chamber of an inner combustion engine, the disadvantage is that a high water pressure about 60 to 960 Psi is required for operation, and a complicated wiring is need for working with a high pressure pump, so the volume is big, the consumed energy is high and the production cost is inevitably increased, and the water used has to be purified without any debris thereby the water discharging amount being hard to be precisely controlled.

Second: take the U.S. Pat. Nos. 4,476,817 and 6,698,387 for examples. The technical features of the mentioned patents is that the waste heat discharged by an engine is used for boiling water for generating steam, the disadvantage is the wiring is complicated, the cost is high, it can be operated when the engine is cooled, and unable to satisfy the requirements of cooperating with the engine acceleration and the loading status.

Third: take the U.S. Pat. Nos. 4,096,829, 4,240,380, 4,279,223, 4,300,483, 4,351,289, 4,448,153, 4,448,179, 4,800,848 and 5,199,386 for examples. The technical features of the mentioned patents is that a the vacuum sucking force of a carburetor is used for atomizing water, the disadvantage is that such design is old fashioned, and the atomization effect is poor, only can be applied in a naturally aspirated engine, and cannot be applied a turbine engine or gasoline or diesel ejection engine.

Fourth: take the U.S. Pat. Nos. 4,300,483, 4,300,484, 4,300,485, 4,406,255, 4,459,943 and 6,082,311 for examples. The technical features of the mentioned patents is that compressed air is used for atomizing water, the disadvantage is that an additional air compressor is required, so the whole weight is heavier, the power consumption is higher, the product cost is increased and the atomization effect is poor.

Fifth: take the U.S. Pat. No. 4,441,476 for example, the technical feature of the mentioned patent is that the compressed air of the air assisting break system of a heavy vehicle is used for atomizing water, the disadvantage is that a safety concern is caused, and it can only be applied in a vehicle equipped with the air pressure assisting break system, and the amount of atomization is unable to be precisely controlled.

Sixth: take the U.S. Pat. Nos. 6,357,671 and 6,698,387 and the Japan Patent No. 60054721 and No. 60172377 for examples. The technical features of the mentioned patents is that an ultrasonic ceramic atomizer is used for oscillating and atomizing water, the disadvantage is that a submerged ultrasonic atomizer is adopted, the operation frequency is about 1 to several MHZ, and the power consumption required by the operation is larger than 50 Watts, so the consumed power is considerably high and the loading provided to the battery is increased; moreover, if the water level in a container is slightly lower or subject to a upslope/downslope condition or a bumpy road surface, the ceramic plate is very likely to be burned and damaged due to water lacking and over heating, and the amount of atomization is unable to be precisely controlled with respect to the engine rotation speed, so the performance is poor and unreliable.

SUMMARY OF THE INVENTION

One primary objective of the present invention is to provide an atomizer used in the inner combustion engine and having energy saving and debris reducing function in which with the driving and regulating provided by a sensing controlling mechanism, a flow regulating mask allows an atomizing mechanism to atomize the proper amount of water with respect to the actual conditions of the rotation speed and loading status of an engine thereby allowing the atomized mist to be guided into the inner combustion engine through the flow regulating mask, so the inner combustion engine is provided with effects of reducing the exhaust, reducing the oil consumption, increasing the service life, increasing the horse power and the torque output, and also be provided with advantages of simple structure, low cost, excellent atomization effect, small volume, light weight, low power consumption, maintenance free, low cost of consumable parts and allowing the user to install by himself.

For achieving said objective, the present invention provides an atomizer used in the inner combustion engine and having energy saving and debris reducing function, which includes: a housing having an inlet pipe and an outlet pipe being formed at one end, the interior of the housing is installed with a flow regulating mask communicated with the outlet pipe, and a bottom plate is installed inside the housing close to the bottom end; a working fluid filled in the housing and disposed above the bottom plate; a floating carrier installed in the housing and floating on the liquid surface of the working fluid; at least an atomizing mechanism installed on the floating carrier; and a sensing controlling mechanism installed below the bottom plate and connected to the atomizing mechanism.

According to one embodiment of the present invention, the inlet pipe is further provided with a filter.

According to one embodiment of the present invention, the flow regulating mask includes a conical mask member and a pipe member communicated with the outlet pipe and the conical mask member.

According to one embodiment of the present invention, the working fluid is water.

According to one embodiment of the present invention, the floating carrier is made of porous foaming polyethylene or polypropylene.

According to one embodiment of the present invention, one surface of the floating carrier is formed with plural mounting slots, one end of each of the mounting slots is respectively formed with a syphon hole, each of the atomizing mechanisms includes a ceramic unit connected to the mounting slot and a metal net plate connected to the ceramic unit and corresponding to the syphon hole.

According to one embodiment of the present invention, the atomizing mechanism is connected to the sensing controlling mechanism through a spiral coiling wire.

According to one embodiment of the present invention, the sensing controlling mechanism includes an atomization driving controlling unit and a level sensing warning unit, and the sensing controlling mechanism and the atomizing mechanism are combined with a serial resonance means thereby enabling single atomization driving controlling unit to drive more than two sets of the atomizing mechanisms.

According to one embodiment of the present invention, the atomization driving controlling unit adopts a PWM switching circuit with fixed frequency operation as a driving circuit for the atomizing mechanism.

DETAILED DESCRIPTION OF THE PREFERRED EMBODIMENT

Figure 1:
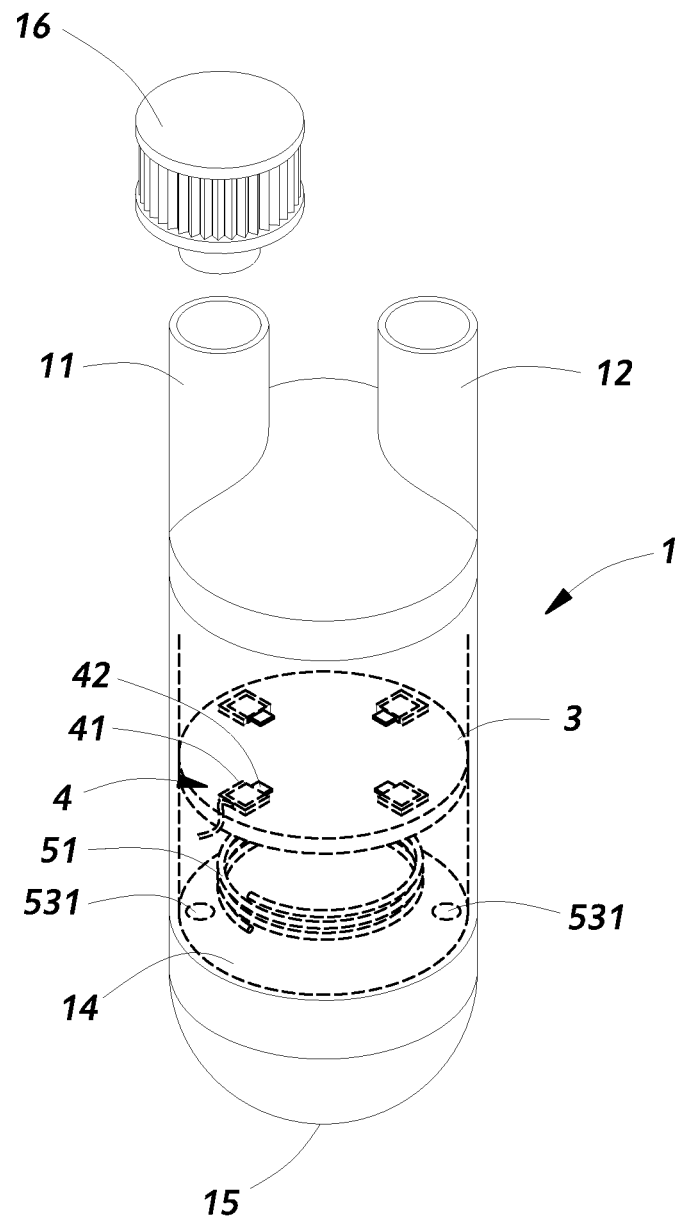
FIG. 1 is a perspective view showing the appearance according to the present invention.
Figure 2:
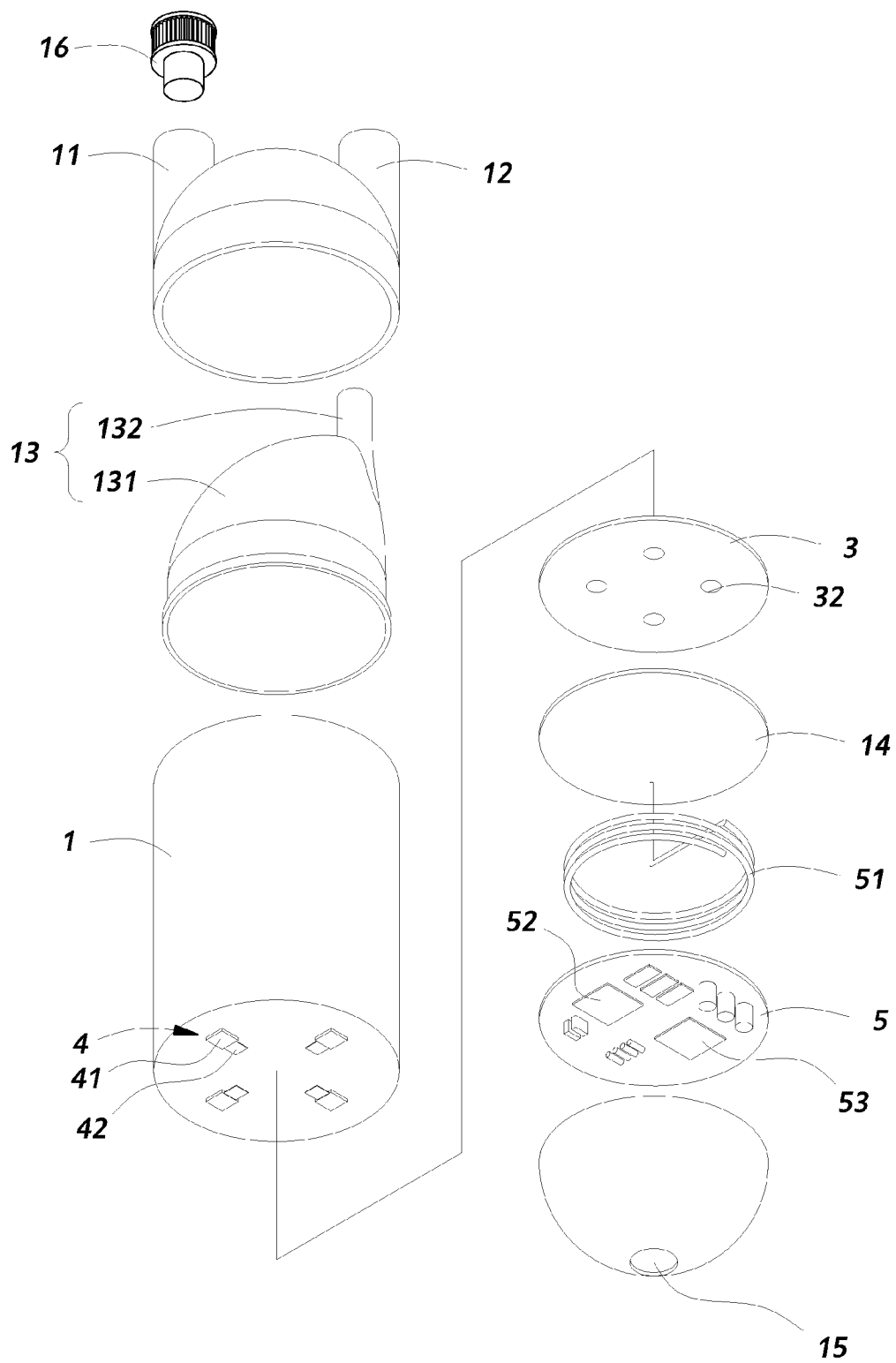
FIG. 2 is a perspective exploded view according to the present invention.
Figure 3:
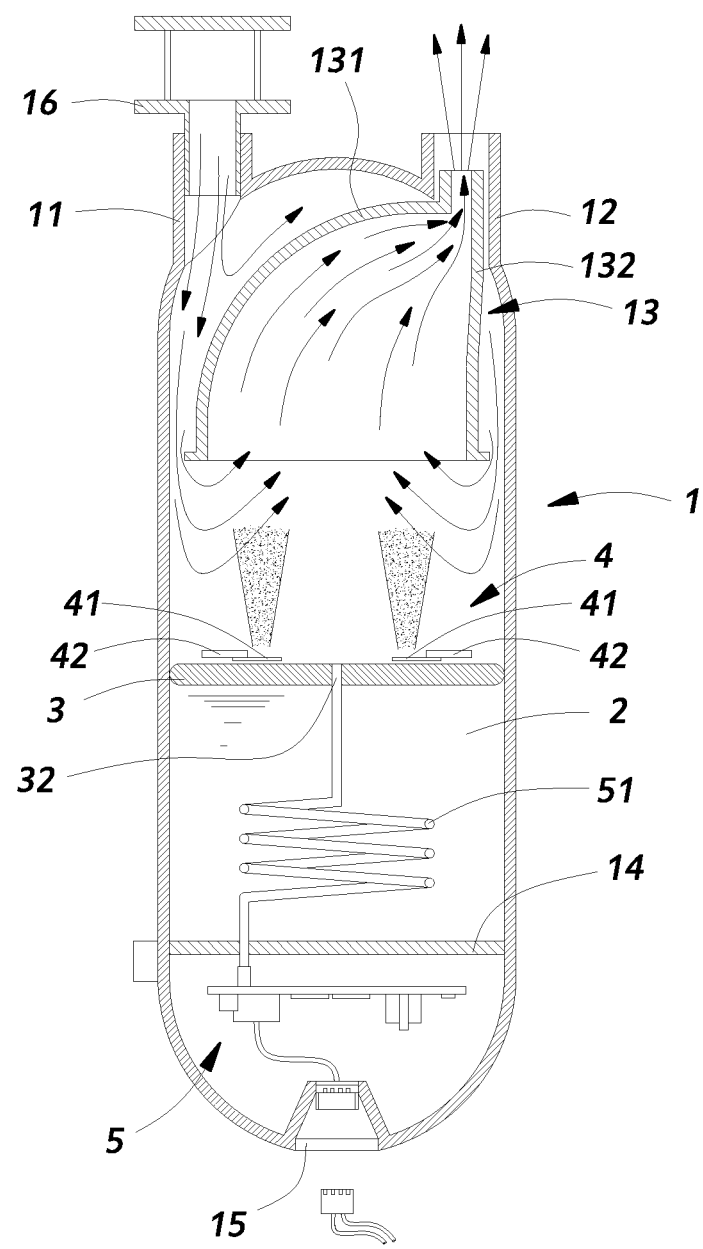
FIG. 3 is a cross sectional view illustrating the operation according to the present invention.
Figure 4:
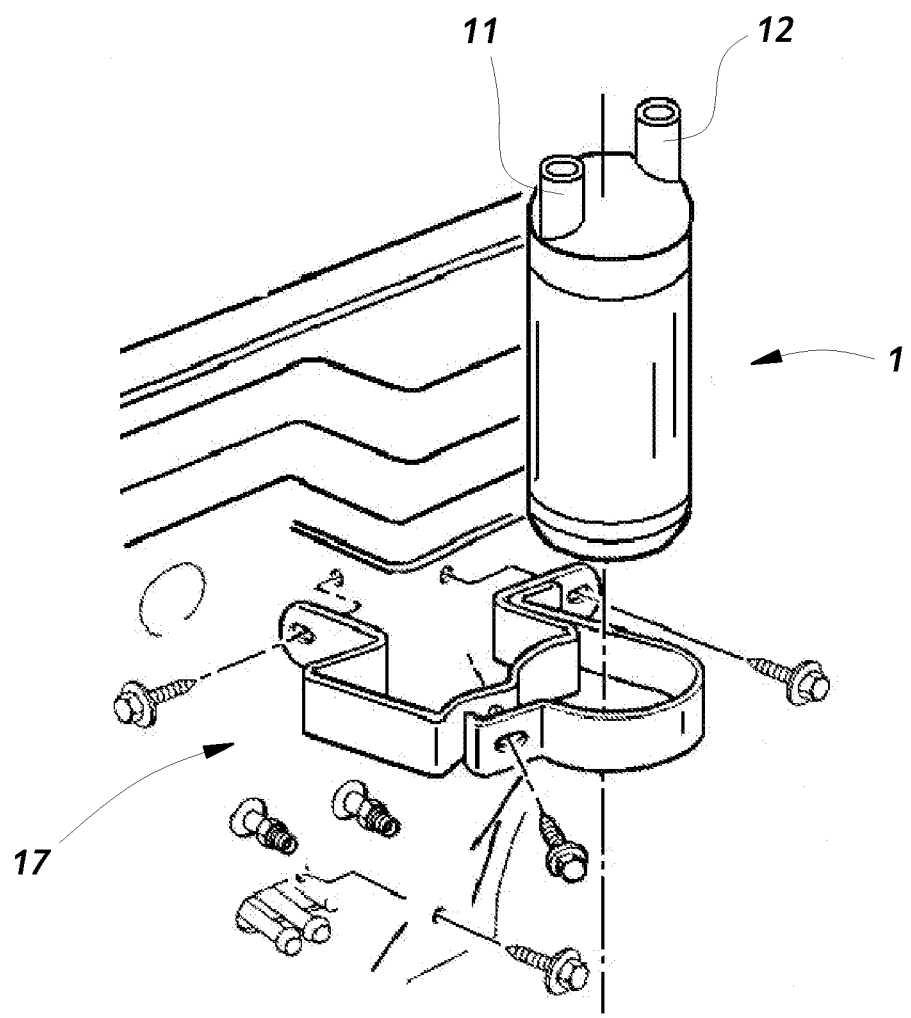
FIG. 4 is a schematic view illustrating the present invention being fastened.
Figure 5:
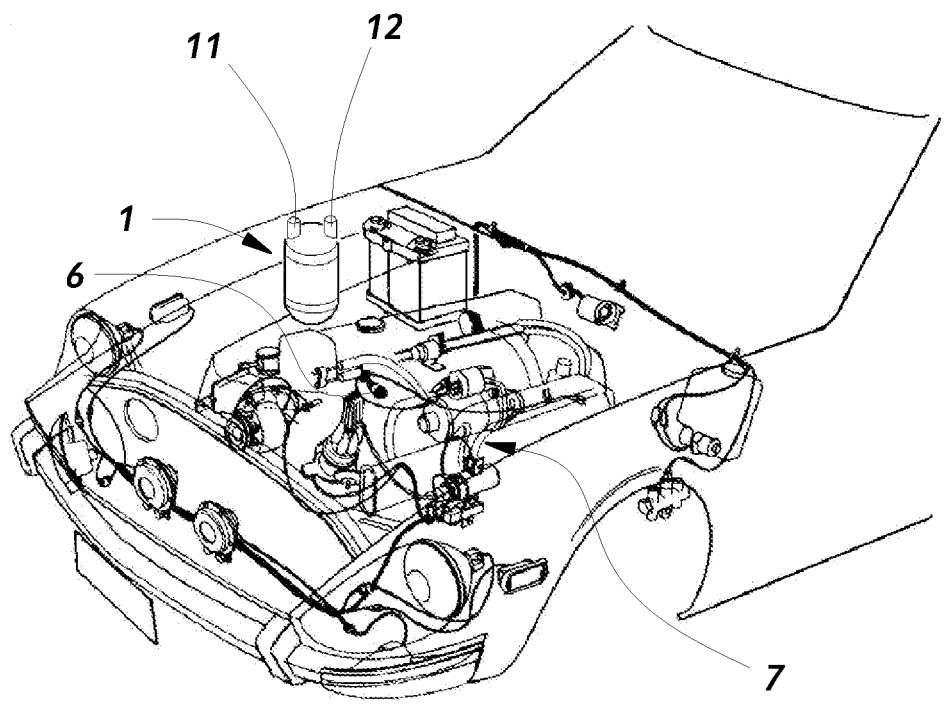
FIG. 5 is a schematic view illustrating the present invention being assembled with an inner combustion engine.
Figure 6:
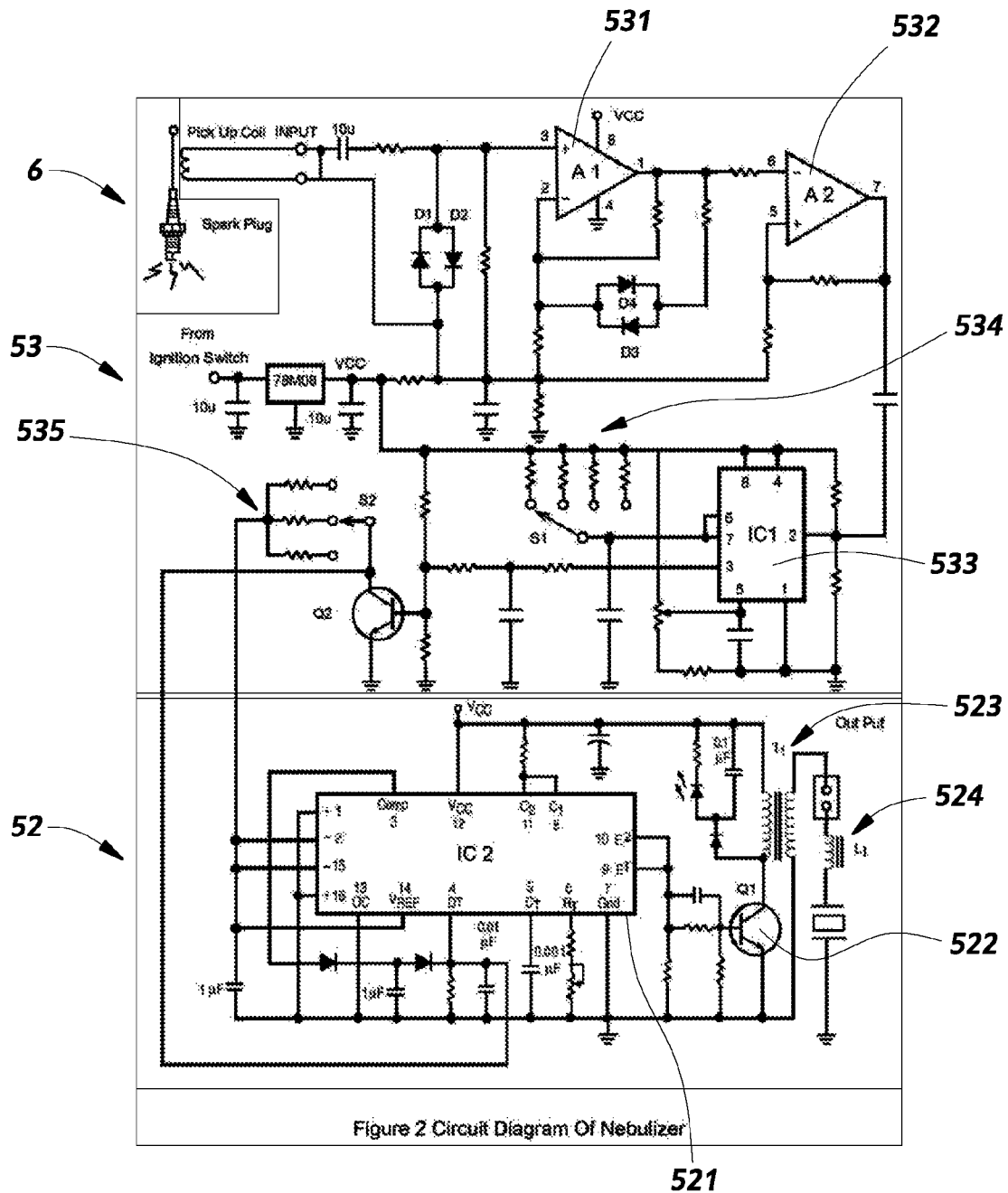
FIG. 6 is a schematic view showing the circuit of the sensing controlling mechanism according to the present invention.
Figure 7:
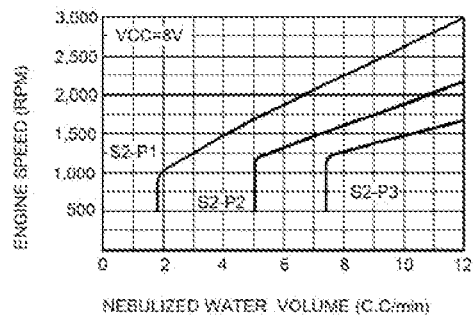
FIG. 7 is a schematic view illustrating the relation of the atomizing mechanism and the terminal position according to the present invention.
Figure 7:
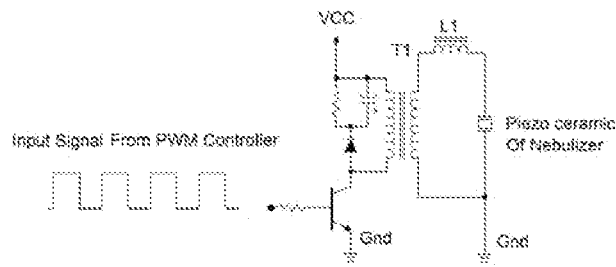
Figure 8:
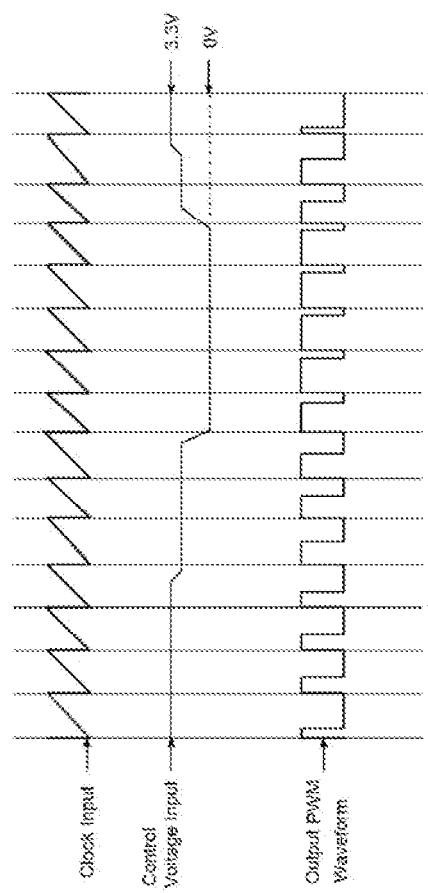
FIG. 8 is a schematic view showing the output pulse of the PWN control according to the present invention.
Figure 9:
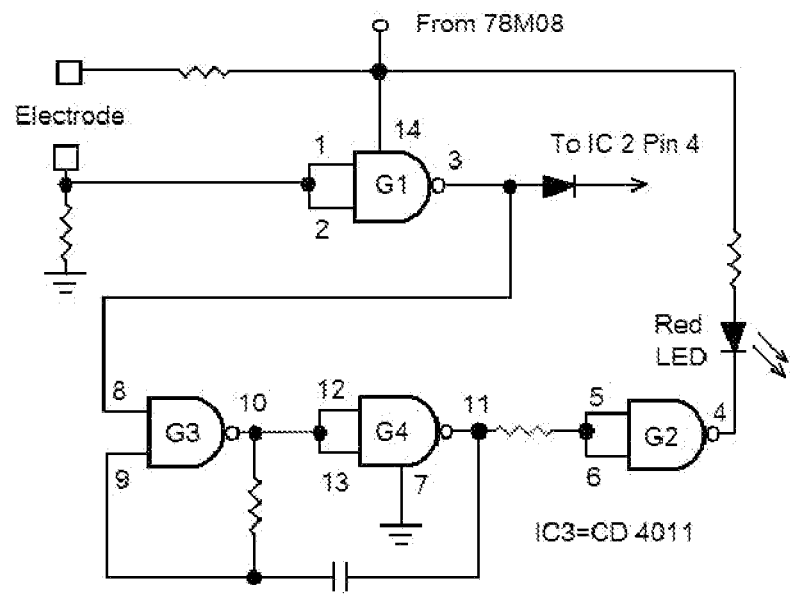
FIG. 9 is a schematic view showing the level sensing circuit according to the present invention.

Referring from FIG. 1 to FIG. 9, wherein FIG. 1 is a perspective view showing the appearance according to the present invention; FIG. 2 is a perspective exploded view according to the present invention; FIG. 3 is a cross sectional view illustrating the operation according to the present invention; FIG. 4 is a schematic view illustrating the present invention being fastened; FIG. 5 is a schematic view illustrating the present invention being assembled with an inner combustion engine; FIG. 6 is a schematic view showing the circuit of the sensing controlling mechanism according to the present invention; FIG. 7 is a schematic view illustrating the relation of the atomizing mechanism and the terminal position according to the present invention; FIG. 8 is a schematic view showing the output pulse of the PWN control according to the present invention; and FIG. 9 is a schematic view showing the level sensing circuit according to the present invention. As shown in figures, the atomizer used in the inner combustion engine and having energy saving and debris reducing function provided by the present invention includes a housing 1, a working fluid 2, a floating carrier 3, at least an atomizing mechanism 4 and a sensing controlling mechanism 5.

One end of the housing 1 is formed with an inlet pipe 11 and an outlet pipe 12, the interior of the housing 1 is installed with a flow regulating mask 13 communicated with the outlet pipe 12, and a bottom plate 14 is installed inside the housing 1 close to the bottom end, a penetrated hole 15 is formed at the bottom end of the housing 1, wherein the housing 1 made of light-pervious polycarbonate or polysulfone, and the location where the inlet pipe 11 is formed is further installed with a filter 16, and the flow regulating mask 13 includes a conical mask member 131 and a pipe member 132 communicated with the outlet pipe 12 and the conical mask member 131.

The working fluid 2 is filled in the housing 1 and disposed above the bottom plate 14, wherein the working fluid 2 can be water.

The floating carrier 3 is installed in the housing 1 and floats on the liquid surface of the working fluid 2, wherein the floating carrier 3 is made of porous foaming polyethylene or polypropylene, and one surface of the floating carrier 3 is formed with plural mounting slots 31, one end of each of the mounting slots 31 is respectively formed with a syphon hole 32.

Each of the atomizing mechanisms 4 is disposed on the floating carrier 3, and each of the atomizing mechanisms 4 respectively includes a ceramic unit 41 connected to the mounting slot 31 and a metal net plate 42 connected to the ceramic unit 41 and corresponding to the syphon hole 32.

The sensing controlling mechanism 5 is disposed below the bottom plate 14 and connected to the atomizing mechanism 4 through a spiral coiling wire 51, and the sensing controlling mechanism 5 includes an atomization driving controlling unit 52 and a level sensing warning unit 53, and the bottom end of the sensing controlling mechanism 5 is corresponding to the penetrated hole 15 at the bottom end of the housing 1, thereby the sensing controlling mechanism 5 being protected from being dampened through utilizing the penetrated hole 15 to prevent external water from entering.

Referring to FIG. 4 to FIG. 9, when the present invention is in use, the housing 1 is fastened through a fasten unit at any proper location of the inner combustion engine, and for allowing the outlet pipe 12 to be communicated with a gas intake manifold of the inner combustion engine, if a gasoline engine is adopted, the atomization driving controlling unit 52 is connected to a high voltage wire (not shown in figures) of a spark plug 6, and the atomization driving controlling unit 52 can adopt a pulse width modulation switching topology (PWM) as a technical main frame, and a non-contact type sensing technique is adopted for assistance, so the whole frame is: a pick up coil 7→a F/V converter→the atomization driving controlling unit 52 (pulse width modulation, PWM) →the atomizing mechanism 4.

The detail illustration for the mentioned frame is as followings: (1) the pick up coil 7: for increasing the convenience provided by the present invention, the sensor is composed of a set of sensing coil formed in a buckled status, take the gasoline engine for example, when in use, the buckled sensing coil is buckled on high voltage wire connected to the spark plug 6, so the pulse frequency signal of the spark plug ignition is able to be obtained through a sensing means under a condition of not breaking the isolation layer of the wire, then the frequency signal is sent to the F/V circuit for being processed. (2) the F/V converter: a first operational amplifier 531 is used for amplifying, limiting and shaping the frequency signal with small amplitude sent by the sensing coil, then a second operational amplifier 532 is used for inverting the signal then inputting to the triggering input end of an integrator 533 thereby enabling the level of the output DC voltage to be in direct proportional to the altering and converting of the input frequency. The function of a first selecting switch 543 is for selecting the integral parameter of the DC output voltage of the integrator 533, that is because even in a condition of having the same engine rotation speed, different numbers of engine cylinders would generate different spark plug ignition frequency, the difference is set through adjusting the terminal position of the first selecting switch 543, thereby satisfying different type of engine requiring different atomization parameter setting. A second selecting switch 535 is used for selecting the idle speed of the engine with different displacement volume (C.C.) and the setting for the required atomization curve in the full working rotation speed (as shown in FIG. 7). (3) The atomization driving controlling unit 52: a controller 521 is used for converting the voltage signal sent by the integrator 533 into a pulse output with fixed frequency. When the input voltage is zero, the output pulse width of the controller 521 is maximum, when the input voltage is 3.3V, the output pulse width of the controller 521 is close to zero. The pulse output is sent to a base of a transistor 522, or a gate if a field effect transistor (FET) being adopted as the transistor 522, so the transistor 522 is enabled to be driven to perform ON-OFF operation, and a transformer 523 connected to the transistor 522 is driven, thereby enabling the DC current alliteratively flowing in a primary coil winding of the transformer 523 to magnetize the ferrite core of the transformer 523, then a secondary coil winding is sensed, the high voltage DC pulse is sensed in the secondary coil winding with respect to the turn ratio of the primary and the secondary coil winding of the transformer, the DC pulse is then transferred to the atomizing mechanism 4 through an inductor 524 connected in series, thereby allowing a sine wave with high amplitude being generated through resonance, the sine wave allows the ceramic unit 41 of the atomizing mechanism 4 to be oscillated for generating the atomization effect. As such, the atomizer is enabled to precisely adjust the amount of atomization according to different engine rotation speed, when the engine is in high rotation speed, the pulse width outputted by the controller 521 is widened, the amplitude of the ultrasonic ceramic is increased, thereby allowing the amount of atomization outputted by the atomizer to be increased. On the other hand, when the engine is in low rotation speed, the pulse width outputted by the controller 521 is shortened, the amplitude of the ultrasonic ceramic is decreased, thereby allowing the amount of atomization outputted by the atomizer to be decreased, so the objective of precise controlling is achieved. Accordingly, when in use, external air is introduced in the housing 1 through the inlet pipe 11 and the filter 16, the filter 16 is served as a plug for the inlet pipe 11 and used for filtering the debris and impurities contained in the air which is about to enter the housing 1, thereby protecting the engine from being worn and damaged, then the atomizing mechanism 4 is driven by the atomization driving controlling unit 52 of the sensing controlling mechanism 5 thereby enabling the atomizing mechanism 4 to generate oscillation, and the working liquid 2 is allowed to generate a small syphon effect through the syphon holes 32 formed on the floating carrier 3 and the working liquid 2 is in contact with the metal net plate 42 through the surface tension provided by the liquid itself, then the liquid is screened by micro holes formed on the metal net plates 42 so as to be discharged from the liquid surface and formed as a micro drop which is upwardly ejected for forming a thick mist, the working fluid 2 is therefore atomized, and the air introduced by the inlet pipe 11 and the filled working liquid 2 are evenly guided to the inner wall of the housing 1, the mist generated by the atomizing mechanism 4 is sucked by the vacuum sucking force of the gas intake manifold of the inner combustion engine, and upwardly conveyed, regulated and collected by the flow regulating mask 13 and then outputted from the outlet pipe 12, as such, the two airflows respectively flowing in the inlet pipe 11 and the outlet pipe 12 and having opposite flowing direction are able to be regulated, guided and collected by the flow regulating mask 13 in the housing 1 thereby being able to smoothly flow without generating turbulence due to interfere or stir, so the mist generated by the atomizing mechanism 4 is able to be fully outputted without being adhered on the inner wall of the housing 1 thereby preventing the mist from condensing and the atomizing performance being kept, so the stability and consistency of the amount of atomization can be ensured.

Moreover, in the atomization driving controlling unit 52, a PWM switching circuit is adopted, this is a converter with fixed working frequency which would not be affected by the environmental temperature and the altering working voltage, so the frequency stability is very high (as shown in FIG. 8). 2: a L.C series resonance wiring is adopted, the disadvantage of frequency drifting caused by the capacity of the ceramic plate being altered can be solved, and because the serial inductor has resonance impedance (XL), the resonance impedance of the inductor is: $xL=2\pi fL$, thereby providing an effect of limiting the current, so the ultrasonic ceramic plate is protected from being burned and damaged due to the overly large current. In addition, under the condition of not causing the core of the driving transformer being over loaded and saturated, several L.C series resonance circuits can be connected in parallel for achieving a multi-task of utilizing single driving circuit to drive several ultrasonic ceramic plates. In actual practice, the transformer is made through winding the core with the PC44ER14.5/6Z provided by the TDK based in Jason, so six sets of ultrasonic ceramic plates can be easily driven without being saturated, and according to the present invention, from the output terminal of the driving circuit to the plural sets of atomizing mechanisms 4 installed on the floating carrier 3, only one set of helical wound wire with dual wire winding is required to be connected for accomplishing the loop.

When in use, the pulse frequency signal of the spark plug ignition is obtained by the atomization driving controlling unit 52 for being calculated, then according to different atomization parameters required by different types of engine, one or plural atomizing mechanisms 4 are driven, as such, the atomizing mechanism 4 is able to cooperate with the working fluid 2 for precisely adjusting the output of the amount of atomization according to different engine rotation speed, for example: when the engine is in high rotation speed, the amplitude of the ceramic unit 41 is increased, so the amount of atomization of the metal net plate 42 cooperating with the working fluid 2 is increased, on the other hand, when the engine is in low rotation speed, the amplitude of the ceramic unit 41 is decreased, so the amount of atomization of the metal net plate 42 cooperating with the working fluid 2 is decreased, thereby achieving the objective of precise controlling.

Because the floating carrier 3 floats on the surface of the working fluid 2, the stability and the degree of freely floating is provided by the spiral coiling wire 51 (spring-like wire), so a minimum pulling force can be provided without causing the draft loading while the floating carrier 3 floating on the liquid surface, so the spiral coiling wire 51 is enabled to provide the proper stability and the compliance to the maximum inclined angle while being subject to the massive ups and downs caused by the water level altering and the bumpy road surface, even when the inclined angle of the housing 1 reaches or exceeds 45 degrees, the floating carrier 3 is able to be fully remained on the liquid surface, so the atomization can be stably kept without being terminated, and when subject to a rapid angle altering, the floating carrier 3 is provided with a proper degree of freely adjusting thereby being prevented from losing control or even being turned over.

Moreover, the user can observe the level of the working fluid 2 from the exterior, the level of the working liquid 2 can also be sensed by the level sensing warning unit 53, when the level sensing warning unit 53 senses the working fluid 2 is in the low level, the atomization driving controlling unit 52 is informed for stopping the atomizing operation of the atomizing mechanism 4, and a LED 531 or other means is used for issuing a warning, so when the liquid surface of the working fluid 2 in the housing 1 is overly low, the atomization is stopped and a warning means is also provided (the relevant circuit is shown in FIG. 9).

Based on what has been disclosed above, the atomizer used in the inner combustion engine and having energy saving and debris reducing function provided by the present invention is able to effectively solve the disadvantages existed in prior art, and with the driving and regulating provided by the sensing controlling mechanism, the flow regulating mask allows the atomizing mechanism to atomize the proper amount of water with respect to the actual conditions of the rotation speed and loading status of the engine thereby allowing the atomized mist to be guided into the inner combustion engine through the flow regulating mask, so the inner combustion engine is provided with effects of reducing the exhaust, reducing the oil consumption, increasing the service life, increasing the horse power and the torque output, and also be provided with advantages of simple structure, low cost, excellent atomization effect, small volume, light weight, low power consumption, maintenance free, low cost of consumable parts and allowing the user to install by himself.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An atomizer used in the inner combustion engine and having energy saving and debris reducing function, including:
    a housing having an inlet pipe and an outlet pipe being formed at one end, the interior of the housing is installed with a flow regulating mask communicated with the outlet pipe, and a bottom plate is installed inside the housing close to the bottom end;
    a working fluid filled in the housing and disposed above the bottom plate;
    a floating carrier installed in the housing and floating on the liquid surface of the working fluid;
    at least an atomizing mechanism installed on the floating carrier; and
    a sensing controlling mechanism installed below the bottom plate and connected to the atomizing mechanism.

2. The atomizer used in the inner combustion engine and having energy saving and debris reducing function according to claim 1, wherein the inlet pipe is further provided with a filter.

3. The atomizer used in the inner combustion engine and having energy saving and debris reducing function according to claim 1, wherein the flow regulating mask includes a conical mask member and a pipe member communicated with the outlet pipe and the conical mask member.

4. The atomizer used in the inner combustion engine and having energy saving and debris reducing function according to claim 1, wherein the working fluid is water.

5. The atomizer used in the inner combustion engine and having energy saving and debris reducing function according to claim 1, wherein the floating carrier is made of porous foaming polyethylene or polypropylene.

6. The atomizer used in the inner combustion engine and having energy saving and debris reducing function according to claim 1, wherein one surface of the floating carrier is formed with plural mounting slots, one end of each of the mounting slots is respectively formed with a syphon hole, each of the atomizing mechanisms includes a ceramic unit connected to the mounting slot and a metal net plate connected to the ceramic unit and corresponding to the syphon hole.

7. The atomizer used in the inner combustion engine and having energy saving and debris reducing function according to claim 1, wherein the atomizing mechanism is connected to the sensing controlling mechanism through a spiral coiling wire.

8. The atomizer used in the inner combustion engine and having energy saving and debris reducing function according to claim 1, wherein the sensing controlling mechanism includes an atomization driving controlling unit and a level sensing warning unit, and the sensing controlling mechanism and the atomizing mechanism are combined with a serial resonance means thereby enabling single atomization driving controlling unit to drive more than two sets of the atomizing mechanisms.

9. The atomizer used in the inner combustion engine and having energy saving and debris reducing function according to claim 8, wherein the atomization driving controlling unit adopts a PWM switching circuit with fixed frequency operation as a driving circuit for the atomizing mechanism.

* * * * *